United States Patent [19]
van der Meer

[11] Patent Number: 4,716,199
[45] Date of Patent: Dec. 29, 1987

[54] RESIN COMPOSITION AND ARTICLES FORMED THEREFROM

[75] Inventor: Roelof van der Meer, Bergen op Zoom, Netherlands

[73] Assignee: General Electric Company, Selkirk, N.Y.

[21] Appl. No.: 847,388

[22] Filed: May 23, 1986

Related U.S. Application Data

[63] Continuation of Ser. No. 586,916, Mar. 7, 1984, abandoned.

[30] Foreign Application Priority Data

Mar. 17, 1983 [NL] Netherlands ............ 8300956

[51] Int. Cl.⁴ ............................................ C08L 53/00
[52] U.S. Cl. ............................... 525/92; 264/176.1; 264/331.13; 525/68; 525/905
[58] Field of Search ................... 525/92, 905, 68

[56] References Cited

U.S. PATENT DOCUMENTS 3,960,808  6/1976  Katchman ............ 525/135
4,038,343  7/1977  Yonemitsu ........... 525/135

Primary Examiner—Jacob Ziegler
Attorney, Agent, or Firm—Michael J. Doyle

[57] ABSTRACT

The multiaxial impact strength of resin compositions which comprise polyphenylene ether and a styrene resin can be improved by adding unsaturated alkenyl aromatic-diene diblock copolymers.

3 Claims, No Drawings

RESIN COMPOSITION AND ARTICLES FORMED THEREFROM

This application is a continuation of U.S. Ser. No. 586,916 filed Mar. 7, 1984, abandon. This application claims priority from an application Ser. No. 83 00 956 first filed in the Netherlands, Mar. 17, 1983.

The invention relates to a resin composition which comprises a polyphenylene ether, a styrene resin and an alkenyl aromatic-diene block copolymer. The invention also relates to articles formed from said resin compositions.

Resin compositions comprising a polyphenylene ether, a styrene resin and an alkenyl aromatic-diene block copolymer are disclosed in U.S. Patent Specification No. 3,994,856. The known resin compositions comprise as a block copolymer an unsaturated triblock copolymer A-B-A', wherein A and A' are derived from a vinyl aromatic compound and B is derived from a conjugated diene compound.

It has quite unexpectedly been found that the addition of special block copolymers, namely of unsaturated diblock copolymers, results in resin compositions having a better multiaxial impact strength, as appears from the drop weight impact strength.

The resin composition according to the invention is characterized in that it comprises an unsaturated alkenyl aromatic-diene diblock copolymer.

As an unsaturated alkenyl aromatic-diene diblock copolymer, the resin composition according to the invention preferably comprises an unsaturated styrene-butadiene diblock copolymer. The unsaturated diblock copolymer is preferably used in a quantity of 1-35% by weight calculated with respect to the resin composition.

The resin composition according to the invention comprises a polyphenylene ether, a styrene resin and an unsaturated alkenyl aromatic-diene diblock copolymer.

Polyphenylene ethers and their preparation are known per se from a large number of patent publications, inter alia from U.S. Patent Specification Nos. 3,306,874, 3,306,875, 3,257,357 and 3,257,358. The resin composition according to the invention may comprise one or more of all the known polyphenylene ethers, notably also homopolymers and copolymers. The polyphenylene ether in the resin composition according to the invention preferably comprises units derived from 2,6-dimethyl phenol.

As a styrene resin, the resin composition according to the invention comprises one or more polymers which comprise units derived from styrene itself or from substituted styrene compounds. Polystyrene resins are to be understood to include also modified styrene resins, for example, rubber-modified styrene resins and copolymers, for example, styrene-acrylonitrile copolymers, styrene-butadiene copolymers, styrene-acrylonitrile-butadiene copolymers, etc. Halogenated styrene polymers and halogenated styrene copolymers can also be used.

The resin composition according to the invention may comprise polyphenylene ether and polystyrene in any relative quantities: the ratio polyphenylene ether to polystyrene is preferably between 1:20 and 4:1, more in particular 1:5 and 1:1.

The resin composition according to the invention comprises an unsaturated alkenylaromatic-diene diblock copolymer. Such copolymers comprise two blocks: one block derived from an alkenylaromatic compound, for example, styrene, alpha-methylstyrene, vinyl toluene, vinyl xylene, vinyl naphtalene or mixtures of such compounds, and one block derived from a diene compound, for example, butadiene, isoprene, 1,3-pentadiene, 2,3-dimethyl-butadiene or mixtures of such compounds. The block copolymer may consist of two blocks which are directly coupled together, or also of two blocks which are bonded together via a "random" copolymer of the alkenylaromatic compound and the diene compound from which the blocks are built up (so-called "tapered" diblock copolymers). Diblock copolymers having 20–40% by weight of the alkenyl aromatic compound and having 60–80% by weight of the diene compound are suitable for the resin mixture according to the invention. The alkenyl aromatic block may have a molecular weight of, for example, 10,000–100,000; the diene block may have a molecular weight of 50,000–500,000. Methods of preparing block copolymers are known per se. A survey of suitable methods is to be found in R. B. Seymour and G. A. Stahl, Polym. Plast. Technol. Eng. 10(1), 33–47 (1978), and in the literature references cited therein. Moreover, suitable unsaturated diblock copolymers are commercially available.

In addition to the above-mentioned constituents, the resin compositions according to the invention may comprise any additive known for similar resin mixtures, for example, additives to improve the flame-retarding properties, stabilizers, pigments and dyes, fillers, reinforcing fibres, antistatics and mineral oil.

The invention will be explained with reference to the following specific examples:

EXAMPLE I

Samples were prepared comprising 25.5 parts by weight of poly(2,6-dimethyl-1,4-phenylene)ether, 50.5 parts by weight of a rubber-modified polystyrene, 1.5 parts by weight of low-density polyethylene, 1.5 parts by weight of mineral oil, 0.5 parts by weight of phosphite stabilizer, 0.15 parts by weight of zinc oxide, 0.15 parts by weight of zinc sulphide, 5 parts by weight of a saturated styrene-butadiene-styrene triblock copolymer (Kraton G) and 20 parts by weight of an unsaturated styrene-butadiene block copolymer. In Example A recorded hereinafter in the Table, an unsaturated styrene-butadiene diblock copolymer according to the invention was used (Cariflex DX-1000 of Shell; having a styrene content of 24% by weight; a butadiene content of 76% by weight; molecular weight styrene block 28,500; molecular weight of diblock=128,000); in Example B an unsaturated styrene-butadiene-styrene triblock copolymer according to U.S. Patent Specification No. 3,994,856 was used (Cariflex TRKX-65 of Shell having a styrene content of 28% by weight, a butadiene content of 72% by weight; molecular weight styrene block=11,000 molecular weight of triblock=80,000).

The compositions according to Examples A and B were extruded in a double blade extruder of Werner Pfeiderer at a speed of 300 rpm and a temperature adjustment of 275° C. Test samples were formed from the extruded masses and the properties thereof were determined. The results obtained are recorded in Table A hereinafter.

TABLE A

| Composition | A | B* |
|---|---|---|
| Properties | | |
| Thermal deformation temperature | 105 | 106 |

TABLE A-continued

| Composition | A | B* |
|---|---|---|
| (load 1,82 MPa; rod 3.2 mm ASTM D648 (°C.) | | |
| Impact strength according to Izod, notched bar, width test bar 3,2 mm ASTM D256 (J/m) | 505 | 450 |
| Drop weight impact strength (according to DIN 53443, p.2, 1975; mass 10 kg; drop height 175 cm; thickness disk 3.2 mm; diameter supporting ring 9 cm) (J) | 115 ± 7** | 75 ± 22** |
| Tensile stress upon fracture ASTM bar DIN 53455 drawing speed 500 mm/min. (MPa) | 32,6 | 30,0 |
| Elongation upon fracture in drawing bar DIN 53455 (%) | 33 | 37,5 |

*according to U.S. Pat. No. 3,994,856
**standard deviation; ten measurements

It may be seen from Table A that the impact strength according to Izod and the multiaxial impact strength according to DIN 53443 of the resin mixture A according to the invention is better than of the resin mixture B.

EXAMPLE II

Resin compositions (C and D) were prepared from the following constituents: 29 parts by weight of poly(2,6-dimethyl-1,4-phenylene)ether, 67 parts by weight of rubber-modified polystyrene, 1.5 parts by weight of mineral oil, 2 parts by weight of low-density polyethylene, 0.5 parts by weight of phosphite stabilizer, 0.15 parts by weight of zinc oxide, 0.15 parts by weight of zinc sulphide and 5 parts by weight of unsaturated styrene-butadiene block copolymer: in composition C a diblock according to the invention, i.e. Cariflex DX-1000, and in composition D a triblock according to U.S. Pat. No. 3,994,856, i.e. Cariflex TRKX-65. The resin mixtures were extruded in the same extruder as used in Example I: one part at a speed of 250 rpm and one part at a speed of 450 rpm. (Adjusted temperature invariably 260° C.). Samples were manufactured from the resulting extrusion masses and their properties were determined. The results obtained are summarized in Table B.

TABLE B

| Composition | C | | D* | |
|---|---|---|---|---|
| Speed extruder | 250 rpm | 450 rpm | 250 rpm | 450 rpm |
| Properties | | | | |
| Thermal deformation temp. (load 1.82 MPa; bar 3,2 mm) ASTM D 648 (°C.) | 111,5 | 111.5 | 110 | 112 |
| Impact strength according to Izod ASTM D 256 (J/m) | 457,5 | 440 | 430 | 442,5 |
| Drop weight impact strength (DIN 53443, p.2, 1975; mass 10 kg; height 175 cm, thickness disk: 3,2 mm; diameter supporting ring 9 cm) (J) | 120 ± 12** | 130 ± 12** | 60 ± 20** | 105 ± 12** |
| Elongation upon fracture DIN 53455 (%) | 37,5 | 30 | 25 | 31 |

*according to U.S. Pat. No. 3,994,856
**standard deviation ten measurements

It may be seen from Table B that the multiaxial impact strength of Sample C according to the invention is better than of coparable samples D which comprised an unsaturated triblock copolymer as described in U.S. Patent Specification No. 3,994,856. This is prominent in particular in test samples manufactured at a speed of 250 rpm which is usual in practice.

I claim:

1. A thermoplastic resin composition having improved multiaxial impact strength comprising:
   100 parts by weight of a resin composition comprising:
   (a) a polyphenylene ether resin or copolymers thereof; and
   (b) a styrene resin or copolymers thereof, the ratio of polyphenylene ether to polystyrene being between 1:20 and 4:1; and 1 to 35 parts by weight per 100 parts (a), (b), and (c) of
   (c) an unsaturated diblock copolymer consisting essentially of 20 to 40 percent by weight of an alkenyl aromatic block and 60 to 80 percent by weight of a diene block, the alkenyl aromatic block having a molecular weight of about 10,000 to 100,000 and the diene block having a molecular weight of about 50,000 to 500,000.

2. A resin composition as in claim 1, wherein said unsaturated diblock copolymer is a styrene-butadiene diblock copolymer.

3. A resin composition as in claim 1, wherein said unsaturated diblock copolymer comprises 1 to 35 percent by weight based upon the weight of (a), (b) and (c).